Patented Sept. 19, 1944

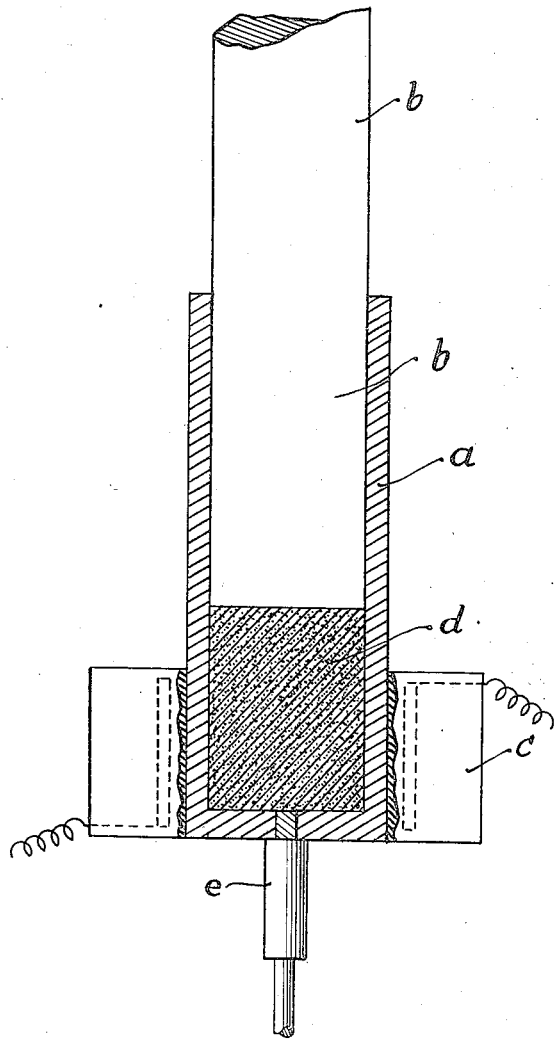

2,358,667

UNITED STATES PATENT OFFICE 2,358,667

METHOD FOR THE PRODUCTION OF SHAPED ARTICLES SUCH AS TUBES, RODS, AND PROFILES FROM MAGNESIUM AND MAGNESIUM ALLOY SCRAP

Max Stern, Kew Gardens, N. Y.

Application December 3, 1941, Serial No. 421,486

2 Claims. (Cl. 29—148)

The invention relates to a method for the production of shaped articles from magnesium and magnesium alloy scrap.

It relates particularly to the direct manufacture of tubes, rods and structural profiles such as T-shaped, U-shaped and I-shaped profiles from magnesium borings, turnings, chippings and filings.

The direct conversion of magnesium and magnesium alloy scrap such as turnings, borings, chippings, filings and the like into finished articles presents very severe difficulties and involves definite fire hazards.

One of these difficulties is caused by the inclusion in this type of magnesium scrap of large quantities of impurities and particularly oil.

In machining and shaping magnesium and magnesium alloys by machine tools, grinding and similar devices great quantities of oil are used which mostly due to surface tension firmly adhere to the scrap particles. This oil must be completely removed before the shaping of the scrap may be undertaken or else the intersecting oil films prevent a perfect unit and coalescence of the scrap particles into homogeneous metal bodies.

Furthermore, the danger of ignition of the magnesium scrap is very greatly increased by the presence of oil which is sometimes present at a rate of up to 35% of the weight of the scrap.

It is generally known that finely divided magnesium turnings and chippings when moist with cutting oil present a very serious hazard; when ignited such wet scrap burns with extreme violence and if confined in a melting pot or drum will develop enough pressure to spray the burning material over a large area and give rise to serious damages and burnings.

For this reason it is recommended that if oil containing fine magnesium or magnesium alloy scrap is encountered it should be spread out in a layer not more than two inches thick and dried with warm air before it is added to a remelting bath or put into drums for shipment. If this is not safe or economical, the wet scrap should be spread out on a metal surface and burned.

Therefore, magnesium scrap of the above referred to type has very little commercial value. In order to utilize the scrap by remelting it is generally added to molten ingots of the virgin metal or melted together with large scrap pieces under precautionary measures that is under cover of a protective slag or in a reducing atmosphere.

The thus produced ingots may then be heated to any desirable temperature because the solid metal will not burn until it is heated to the melting point and may then be shaped into the final articles for instance by a pressing or rolling procedure.

The above recited drawbacks and difficulties of the utilization of fine magnesium and magnesium alloy scrap are avoided by the present invention.

It therefore is the object of the same to convert the scrap directly into the finished or semi-finished articles such as tubes, rods and structural profiles.

It is a further object of the invention to entirely exclude fire hazards during the performance of these shaping methods without the application of specific precautionary measures such as the maintenance of a reducing atmosphere.

A further object of the invention consists in the avoidance of the remelting of the scrap and of the excessive metal losses caused thereby.

It is also an important object of the invention to recover practically the entire metal contents of the scrap.

Several modifications of carrying-out the invention are described in the following.

Magnesium turnings are charged into a centrifuge and herein freed from the major portion of its oil contents. The residual portion of the oil is removed by any suitable method for instance by extraction with solvents. Hereupon the iron is separated from the scrap by a magnet and the scrap dried at a low temperature.

The cleaned and dried turnings are charged into the steel die of an extrusion press, a vertical sectional elevation of which is illustrated in the attached drawing.

The press consists of a steel die composed of cylinder $a$ and piston $b$. The die is at its lower end provided with a tight fitting extrusion nozzle $e$. The lower end of the extrusion cylinder $a$ is surrounded by electric heating equipment $c$.

The magnesium turnings $d$ charged into cylinder $a$ are subjected to a preliminary pressure of 1 to 3 t./sq. inch at a temperature of about 150 to 180° C. This pressure is sufficient to compress the scrap into a more or less coherent body which eliminates self-ignition and fire hazards.

Hereupon the scrap is heated by the circular electric furnace $c$ to a temperature of 250 to 500° C. and preferably 300 to 350° C. The thus treated scrap is then extruded by maintaining this temperature at a pressure of between about 6 to 18 t./sq. inch directly into a final body, such as a tube, a rod and the like.

In this manner the finished article is directly produced from the scrap by a single pressing operation. The chemical as well as the mechanical properties of these articles are practically equivalent to those of the articles manufactured or extruded from the virgin metal ingots; particularly the corrosion resistance is not inferior.

Furthermore, the following observation made by numerous tests is to be noted.

In comparing the pressure which is required to extrude a rod of equal dimensions from equal quantities of magnesium metal on the one side and of fine magnesium scrap on the other side it was found that a much lower pressure was required for the extrusion of the scrap. This pressure is under equal testing conditions approximately 65% of the pressure required for the extrusion of the metal. Also a shorter pressing period is required for the extrusion of the scrap. Whereas ten minutes are needed to extrude a magnesium ingot of one-half pound weight into a rod having a diameter of 4 inches, the same rod can be extruded from scrap in eight minutes without the slightest risk of blocking of the press.

In order to shorten the manufacturing period the invention may also be carried out in the following manner.

Magnesium alloy borings are heated in a suitable furnace such as a rotary kiln to a temperature of about 150° to 180° C., hereby freed from the oil and dried. This heating can be carried out without the slightest risk as the ignition temperature of the turnings lies above 200° C.

The thus cleaned borings are then compressed in a suitable compressing device for instance a hydraulic press at a pressure of about 3 to 5 t./sq. inch into coherent bodies. These bodies can now be heated to any temperature underneath the melting point in an adequate furnace without danger of inflammation because large magnesium bodies do not ignite unless heated to the melting temperature. The coherent scrap bodies are charged into an extrusion press and extruded at a temperature of between 250° to 500° C.

Various changes may be made to the detailed method steps set forth in this description without departing from the broader spirit and scope of the invention, as set forth in the following claims.

I claim:

1. Method of producing final articles, for instance tubes, rods and structural profiles, from magnesium and magnesium alloy scrap comprising compressing the scrap by maintaining the same at a temperature of between about 150–180° C. at a pressure of approximately 1–3 tons per square inch into sufficiently coherent bodies to exclude self ignition, thereupon heating the thus pretreated scrap to a temperature of about between 250–500° C. maintaining this temperature and simultaneously extruding the scrap at a pressure of between about 6–18 tons per square inch directly into the final article.

2. Method of producing final articles, for instance tubes, rods and structural profiles, from magnesium and magnesium alloy scrap comprising compressing the scrap by maintaining the same at a temperature of between about 150–180° C. at a pressure of approximately 1–3 tons per square inch into sufficiently coherent bodies to exclude self-ignition, thereupon heating the thus pretreated scrap to a temperature of about between 250–500° C. maintaining this temperature and simultaneously extruding the scrap at a pressure of between about 6–18 tons per square inch directly into the final article.

MAX STERN.

CERTIFICATE OF CORRECTION.

Patent No. 2,358,667. September 19, 1944.

MAX STERN.

It is hereby certified that error appears in the printed specification of the above numbered patent requiring correction as follows: Page 2, first column, line 21, for "4 inches" read --.4 inches--; and second column, line 35, claim 2, for the word "extruding" read --shaping--; and that the said Letters Patent should be read with this correction therein that the same may conform to the record of the case in the Patent Office.

Signed and sealed this 6th day of February, A. D. 1945.

Leslie Frazer (Seal)  Acting Commissioner of Patents.

CERTIFICATE OF CORRECTION.

Patent No. 2,358,667. September 19, 1944.

MAX STERN.

It is hereby certified that error appears in the printed specification of the above numbered patent requiring correction as follows: Page 2, first column, line 21, for "4 inches" read --.4 inches--; and second column, line 35, claim 2, for the word "extruding" read --shaping--; and that the said Letters Patent should be read with this correction therein that the same may conform to the record of the case in the Patent Office.

Signed and sealed this 6th day of February, A. D. 1945.

Leslie Frazer (Seal) Acting Commissioner of Patents.